Aug. 17, 1926.
E. G. HEINZELMAN
1,596,266
AUTOMOBILE BRAKE
Filed Dec. 19, 1924    2 Sheets-Sheet 1
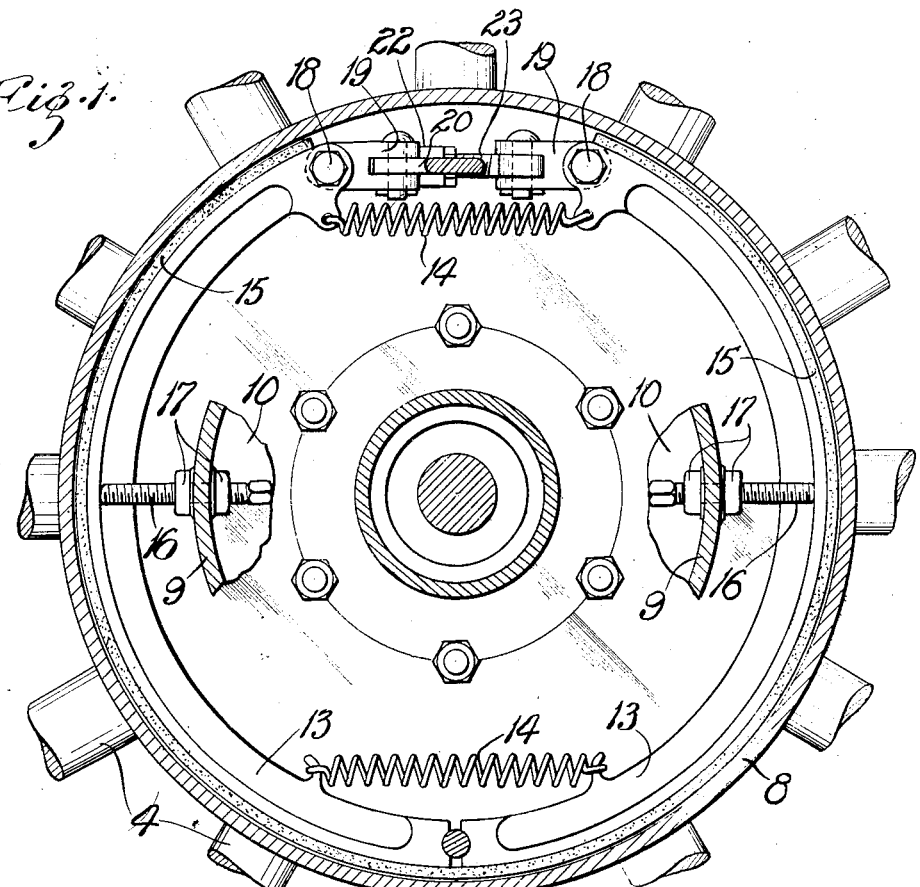
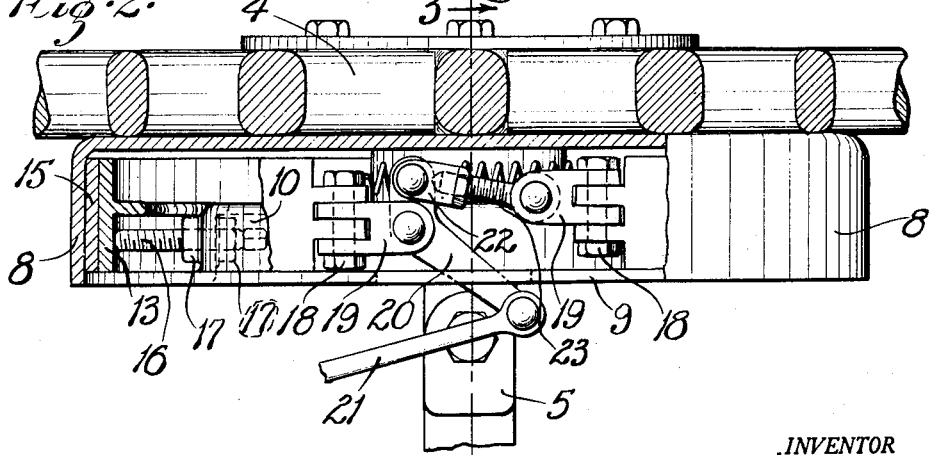
INVENTOR
Edward G. Heinzelman,
BY
His ATTORNEYS.

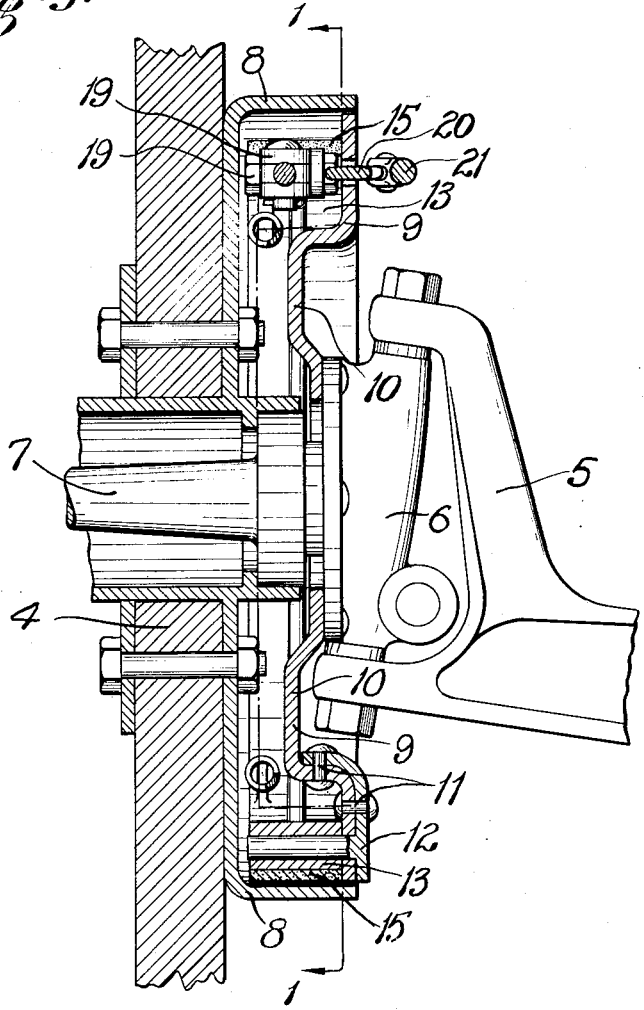

Patented Aug. 17, 1926.

1,596,266

UNITED STATES PATENT OFFICE.

EDMUND G. HEINZELMAN, OF BELLEVILLE, ILLINOIS.

AUTOMOBILE BRAKE.

Application filed December 19, 1924. Serial No. 756,918.

My invention relates to automobile brakes and has for its principal object a brake that is substantially adapted for use on the steering wheels of automobiles, that may be easily applied and that will have great braking action. The invention consists principally in providing the brake with a horizontally disposed floating operating lever. The invention further consists in the brake and in the parts and combinations and arrangements of parts hereinafter described and claimed.

In the accompanying drawing, which forms part of this specification and wherein like reference characters indicate like parts in the several views,—

Fig. 1 is a vertical sectional view of a brake embodying my invention, on the line 1—1 of Fig. 3, the brake being shown as applied to a steering wheel;

Fig. 2 is a top plan view of the same, partly in section; and

Fig. 3 is a vertical sectional view at right angles to the section shown in Fig. 1.

The drawing illustrates a brake embodying my invention applied to a front or steering wheel 4 of an automobile. Mounted between the arms of a bifurcated vehicle axle 5 is a steering knuckle 6 that is provided with a projecting stub axle 7 on which is mounted the automobile wheel 4, the spokes of the wheel being shown in the drawing. Secured to the wheel is a brake drum 8; and secured to the steering knuckle 6 is a brake supporting disk 9. Said brake supporting disk 9 is provided with an annular depressed portion 10. Secured to said disk 9, as by rivets 11, is an abutment 12 for the ends of brake shoes 13. Said brake shoes 13 are provided with springs 14 for drawing them away from the brake drum 8 and with a suitable friction facing 15. Abutments 16 are provided for limiting the movement of the shoes 13 away from the drum 8. Preferably said abutments have threaded portions that extend through holes in the outstanding portion of the brake supporting disk 9 adjacent to the depressed portion 10. The abutment members 16 project outside of the brake disk 9 and adjusting nuts 17 are mounted thereon. Thus the abutment members may be adjusted without removing the wheel from the axle.

Pivotally secured to the ends of the brake shoes 13, as by bolts 18, are links 19. Pivotally secured to one of said links is a lever 20 that is provided with an operating rod 21 at one end. Preferably said lever is a bent lever and its connection with said link is about at the elbow thereof. To the other end of said lever 20 is secured a link 22 that is pivotally secured to the link 19 of the other brake shoe. Preferably said link 22 is provided with a threaded member 23 that is threaded into the body portion of the link, whereby the length of said link may be adjusted.

The lever 20 is of such length that the end thereof that is secured to the operating rod 21 swings in a circle that passes close to the projected knuckle pin. Thus the operation of the brake has no tendency to disturb the position of the wheel. Preferably the link of the rear brake shoe is directly secured to the actuating lever; and the link of the front shoe is connected to the lever by means of the link. Thus, when the operating rod is moved, the tendency is for the rear brake shoe to be moved into position first and then the front brake shoe; whereas in ordinary constructions, the front brake shoe moves into position first. Since the actuating lever has no fixed pivot, but floats between the two brake shoes, it is free to accommodate itself to movements of the brake shoes and to take care of unequal wear of any portion of the brake shoe.

Obviously, numerous changes may be made without departing from the invention, and I do not wish to be limited to the precise construction shown.

What I claim is:—

1. A brake comprising brake members, a floating lever interposed between said brake members in a plane substantially parallel to the axis of the brake and means operatively connecting said operating lever and said brake members, said means comprising a link pivotally secured to one of said members and said lever being pivotally connected to said link and to the other member.

2. A brake comprising brake members, links pivotally secured to said brake members to swing inwardly and outwardly with relation to the axis of the brake, an actuating lever pivotally secured to one of said links to swing in a plane parallel to said axis and a link pivotally secured to the other of said links and to said actuating lever.

3. A brake comprising brake members, links pivotally secured to said brake members, an actuating lever pivotally secured at its middle portion to one of said links to swing in a plane substantially parallel with the axis of the brake and a connecting link secured to the other of said links and to the end of said actuating lever, said connecting link being adjustable lengthwise.

4. A brake comprising brake members, links pivotally secured to said brake members, an actuating lever pivotally secured at its middle portion to one of said members to swing in a plane substantially parallel with the axis of the brake, a connecting link pivotally secured to the other member and to the end of said actuating lever, and means for lengthening or shortening said connecting link.

5. A brake drum, a fixed brake disk, brake members in said drum and adapted to frictionally engage the inner surface thereof, a plurality of circumferentially spaced radially disposed abutment pins carried by said brake disk for limiting the movement of said brake members away from said drum, yieldable means for normally holding said brake members against said abutments and clear of said drum, a floating lever interposed between said brake members in a plane substantially parallel to the axis of the brake and pivotally secured to one of them, a link operatively connecting said operating lever and the other of said brake members, and means for adjusting said abutments towards and away from said brake members without disturbing said drum and disk.

Signed at St. Louis, Mo. this 15th day of December 1924.

EDMUND G. HEINZELMAN.